Oct. 23, 1956

N. C. COOK ET AL 2,768,061

HYDROGEN REDUCTION METHOD AND APPARATUS

Filed Feb. 26, 1953

Inventors:
Newell C. Cook,
James D. Cobine,
John K. Wolfe,
by Paul A. Frank
Their Attorney.

United States Patent Office 2,768,061
Patented Oct. 23, 1956

2,768,061

HYDROGEN REDUCTION METHOD AND APPARATUS

Newell C. Cook, Schenectady, James D. Cobine, Rexford, and John K. Wolfe, Burnt Hills, N. Y., assignors to General Electric Company, a corporation of New York Application February 26, 1953, Serial No. 339,122

10 Claims. (Cl. 23—153)

This invention relates to a novel method and apparatus for effecting reactions between hydrogen and chemical compounds. More particularly, the invention relates to chemical reductions effected by hydrogen in the dissociated or atomic state.

The use of hydrogen as a reducing agent is well known. In the past, difficult hydrogen reductions have been performed under pressures of the order of several hundred atmospheres and at temperatures as high as 1000° C. It has been known in the past that at elevated temperatures hydrogen molecules become dissociated to hydrogen atoms. This dissociation may be brought about by passing molecular hydrogen through an electric arc or it may be brought about simply by passage of the hydrogen through a tube in which a high temperature resistance element is incorporated. Below 2000° C. only a very small proportion of the hydrogen is dissociated. However, as the temperature is increased the degree of dissociation also increases. At 2000° C. only about one part in a thousand of the hydrogen is dissociated, while at 4000° C. the degree of dissociation is approximately 625 parts per thousand.

It is an object of the present invention to utilize atomic hydrogen to effect the reduction of difficultly reducible compounds.

It is another object of the invention to provide a method and apparatus for effecting reduction of compounds not reducible with molecular hydrogen.

It is a further object of the invention to provide a method for making silanes and halosilanes.

It is a still further object of the invention to provide a method of making hydrogen fluoride.

Briefly stated, in accordance with one of its embodiments, this invention is directed toward a method of effecting reduction of a difficultly reducible compound which comprises contacting such a compound with atomic hydrogen.

Figure 1:
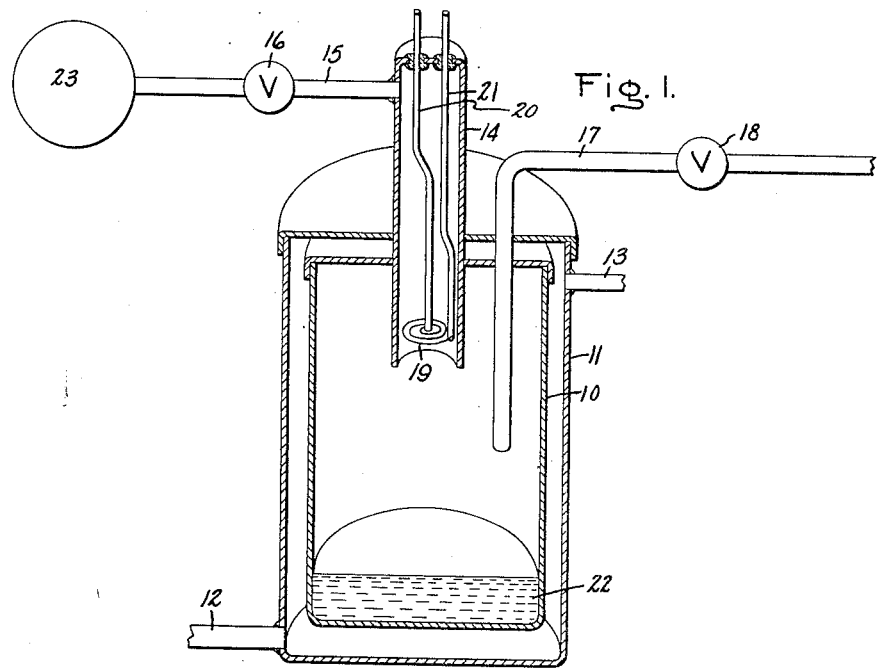
Figure 2:
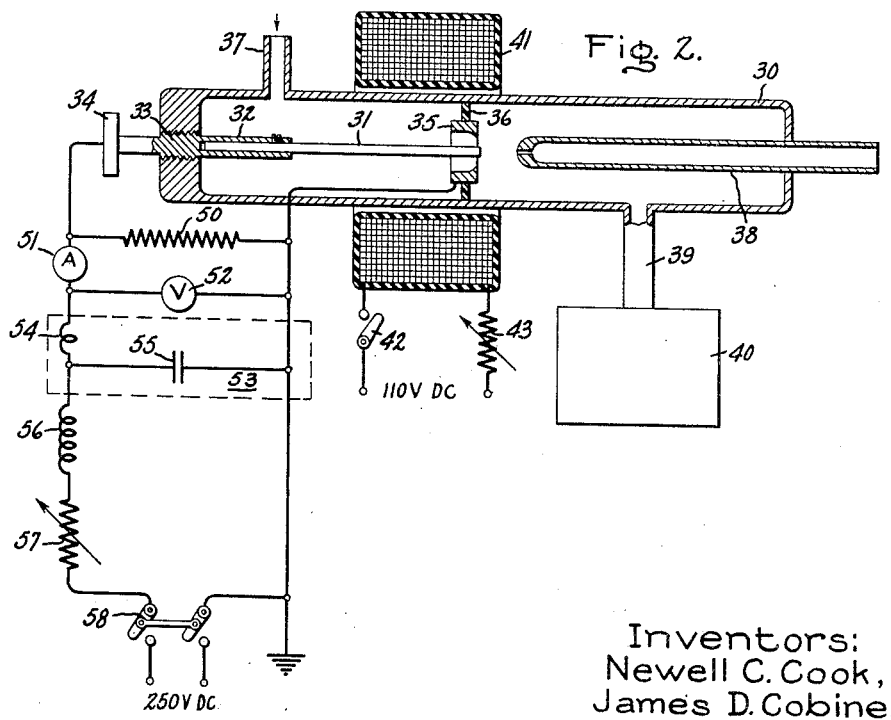

Fig. 1 of the drawing is a schematic view of apparatus utilizing a resistance heating element in accordance with this invention. Fig. 2 illustrates a rotating arc apparatus in accordance with this invention.

Referring to Fig. 1, a container 10 which defines a reaction chamber, has a surrounding jacket 11 provided with an inlet 12 and outlet 13 for circulating fluid to cool the contents of the container 10.

Projecting from the container 10 in integral relationship therewith is a neck 14 defining an elongated passageway at one end of which is connected a reaction mixture inlet tube 15. The inlet tube 15 is connected to a reaction mixture reservoir 23 through a valve 16 which is utilized to control the rate of feed of reaction mixture.

A resistance heating element 19 is positioned at the outlet end of the elongated passageway defined by the neck 14. It is desirable that the resistance heating element 19 be of a configuration which will enable it to occupy most of the cross sectional area of the passageway in order that a maximum number of collisions between the gases passing through the passageway and the element 19 may be effected. Leads 20 and 21 connected to the element 19 are electrically energized during operation of the apparatus.

An outlet tube 17 leads from the chamber defined by the container 10 in order to prevent the buildup of undue pressures within the chamber. A valve 18 in the line of the tube 17 may be utilized to restrict the flow of gases through the tube 17 thereby raising the pressure within the reaction chamber to a point above atmospheric pressure.

Some of the products produced in the apparatus may be highly reactive and therefore it is desirable that the materials of construction be inert toward the reaction products. Glass is satisfactory for many reactions but is subject to etching if one of the reaction products indicated at 22 is hydrogen fluoride. Monel and other inert alloys and metals may be used as a material of construction for many uses of the apparatus. Most reactions will take place at atmospheric pressure and therefore it is not necessary that the container walls possess great thickness. However, it should be emphasized that pressures greater or less than atmospheric pressure are entirely feasible.

The heating element 19 may be composed of metals and similar conducting substances having melting points above 2000° C. Satisfactory substances for this use are tungsten, tantalum, osmium, molybdenum, carbon and tantalum carbide. Since a tantalum filament in contact with hydrogen forms a series of hydrides within the temperature range of 900–1500° C. it is necessary that hydrogen be kept out of contact with such a filament until operating temperatures are reached where a tantalum filament is used. Of the filament materials listed, we prefer tungsten.

In the embodiment illustrated in Fig. 1, a mixture of the compound to be reduced and hydrogen is placed in the reservoir 23. The leads 20 and 21 of the heating element 19 are electrically energized and the valve 16 is opened to admit the mixture to the elongated passageway defined by the neck 14. At the outlet end of the elongated passageway the temperature of the mixture is raised to a point above 2000° C. in the hot zone established by the heating element 19. At this temperature a portion of the hydrogen is dissociated to the atomic state and in this very reactive form its reductive properties are considerably enhanced. Reducing reactions will readily take place and the reduced products are either condensed or cooled below the decomposition temperature on the walls of the container 10. For reactions at atmospheric pressure the valve 18 is maintained in wide open position.

It is understood that reactant to be reduced may be injected downstream from the hot filament 19 and thereby brought in contact with atomic hydrogen at temperatures lower than those present at the hot filament 19. By this procedure we can reduce compounds with atomic hydrogen without subjecting them to high filament temperatures.

Examples of difficultly reducible materials which may be reduced by our method and apparatus are silicon tetrafluoride, silicon tetrachloride, boron trifluoride, methyltrichlorosilane, dimethyldichlorosilane, and others. Silicon tetrafluoride is one of the most stable compounds known. Its heat of formation is 370 kilo calories per gram mol. Hydrogen in molecular form has no reducing effect upon silicon tetrafluoride. However, when the apparatus of Fig. 1 is utilized, a mixture of hydrogen and silicon tetrafluoride in the reservoir 23, the hydrogen being present in excess over stoichiometric ratio the silicon tetrafluoride is readily reduced. In addition to hydrogen fluoride, the reaction products included hydrogen containing compounds such as $SiHF_3$, $SiH_2F_2$, SiH$_3$F, and SiH$_4$, as well as smaller quantities of Si$_2$H$_6$, Si$_2$F$_3$H$_3$, Si$_2$H$_4$F$_2$, and still smaller quantities of higher silanes and fluorosilanes. The yields of these compounds increased rapidly as the temperature of the filament 19 increased up to 2800° C. At temperatures above 2800° C. only small increases in yields were obtained. At a filament temperature of 2000° C. the yield of reaction products was about 5%. At 2800° C. the yield was in excess of 50%. Some reaction products may be obtained with filament temperatures below 2000° C. but yields are very low.

When silicon tetrachloride was substituted for silicon tetrafluoride the reaction products were analogous to those produced using the fluoride except that the products contained chlorine in place of fluorine. When boron trifluoride was used as the starting material the reaction products included boron hydrides.

Fig. 2 illustrates an apparatus in which an arc is utilized to dissociate molecular hydrogen and the hydrogen and material to be reduced are separately introduced to the apparatus. A tube 30, which may be composed of glass or metal, defines an elongated reaction chamber in which is positioned an elongated tungsten electrode 31 mounted in a holder 32 having a threaded portion 33 to enable the electrode 31 to be advanced by the manual rotation of an adjustment wheel 34 positioned on an exterior projection of the electrode holder. Surrounding the tip of the electrode 31 is a cylindrical electrode 35 which may be composed of molybdenum, tungsten, tantalum, osmium or carbon. The electrode 35 is maintained in position by an annular element 36 which also serves to prevent hydrogen entering the reaction chamber without passing through the annular space between the electrodes 31 and 35. Extending into the reaction chamber from the end opposite the mounting for the electrode 31 is a tube 38 through which may be introduced a compound which it is desired to reduce. The tube 38, which may be composed of a metal such as molybdenum, extends close to the tip of the electrode 31. Thus, when hot atomic hydrogen emerges after passage through an arc formed between the electrodes 31 and 35 it establishes contact promptly with material to be reduced entering the reaction chamber through the tube 38. The reaction products then pass through a tube 39 into a condensing chamber 40 which may be a cold trap. Several condensing chambers (not shown) may be arranged in series in order to effect a separation of the reaction products.

A magnetic winding 41 surrounds the tube 30 in the vicinity of the electrode 35. When an arc occupies the space between the electrodes 31 and 35 the energizing circuit for the magnetic coil 41 may be closed at a switch 42 thereby establishing a magnetic field which applies a rotational torque to the arc. The intensity of the field may be controlled by a variable resistor 43. The field can readily produce a rotational velocity as high as 17,000 revolutions per second. This rotating arc promotes the atomization of hydrogen passing therethrough. Of the many methods for enlarging the plasma of the arc we prefer the above rotating method.

A circuit for establishing and controlling the arc consists of a high frequency spark starting unit indicated at 53 composed of an inductance 54 and capacitance 55 connected to a spark gap and high voltage winding of a transformer (not shown). A variable resistance 57 provides manual control of the arc after it is established. In a small apparatus, the resistance 57 may have a rating of about 15 amperes and 100 ohms. A high resistance 50 connected across the electrodes and about a one megohm rating in order to allow residual charges to bleed off. An inductance 56 of about 0.05 henry aids in stabilizing the arc. The current and voltage may be read from an ammeter 51 and voltmeter 52, respectively. A double-pole switch 58 provides manual starting and stopping control of the arc.

In operating the device of Fig. 2 the electromagnet 41 is electrically energized and an arc between the electrodes 31 and 35 is established. Hydrogen is then fed through the tube 37 and the substance to be reduced is introduced through the tube 38. The reaction products emerge through the tube 39. In other respects operation is quite comparable to that previously set forth with reference to Fig. 1 and, if desired, both reactants may be premixed and introduced through the tube 37. It should be emphasized that it is not necessary that the magnetic winding 41 be energized in order to have satisfactory reductions take place. It should be further emphasized that the apparatus of either Fig. 1 or Fig. 2 may be utilized to reduce difficultly reducible compounds of any description provided that the compounds are of such a character that satisfactory contact between the atomic hydrogen and compound to be reduced may be effected in the apparatus of Fig. 1 or Fig. 2. The apparatus may be used to effect the reduction of compounds which may also be reduced by molecular hydrogen but it is normally not advantageous to make use of atomic hydrogen as a reducing agent when molecular hydrogen will suffice.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. A method of producing hydrogen containing compounds of the elements selected from the group consisting of boron and silicon, and a hydrogen halide which method comprises reacting a member selected from the group consisting of silicon tetrafluoride, silicon tetrachloride and boron trifluoride with atomic hydrogen at a temperature above 2000° C. and immediately cooling said hydrogen containing compounds below their decomposition temperature.

2. The process of claim 1 in which silicon tetrafluoride is reacted.

3. The process of claim 1 in which silicon tetrachloride is reacted.

4. The process of claim 1 in which boron trifluoride is reacted.

5. The process of claim 1 in which the reaction is carried out at above 2800° C.

6. The process of claim 1 in which the temperature above 2000° C. is obtained by an electric arc.

7. The process of claim 1 in which the temperature above 2000° C. is obtained by a resistance element.

8. The process of claim 7 in which the resistance element is selected from the group consisting of tungsten, tantalum, tantalum carbide, osmium, molybdenum and carbon.

9. The process of claim 7 in which the resistance element is tungsten.

10. The process of claim 7 in which the resistance element is tantalum.

References Cited in the file of this patent

UNITED STATES PATENTS

| | | |
|---|---|---|
| 1,586,508 | Brutzkus | May 25, 1926 |
| 1,686,349 | Slade | Oct. 2, 1928 |
| 1,686,371 | Fauser | Oct. 2, 1928 |
| 1,746,731 | Koehler | Feb. 11, 1930 |
| 1,960,386 | Lopez | May 29, 1934 |
| 2,032,652 | Du Chaffaut | Mar. 3, 1936 |
| 2,595,620 | Wagner | May 6, 1952 |

(Other references on following page)

OTHER REFERENCES

J. W. Mellor's "A Comprehensive Treatise on Inorganic and Theoretical Chem.," vol. 1, 1922 ed., pages 335, 336 and vol. 5, 1924 ed., page 122. Longmans, Green and Co., N. Y.

Com. Rendu, 54, 1862, article by Sequin starting on page 933.

J. W. Mellor's "A Comprehensive Treatise on Inorganic and Theoretical Chem.," vol. 5, 1924 ed., pages 9 and 123. Longmans, Green & Co., New York.